US010308811B2

(12) United States Patent
Thommassen et al.

(10) Patent No.: US 10,308,811 B2
(45) Date of Patent: Jun. 4, 2019

(54) SOLID COLORANT FOR TINTING PAINT

(71) Applicant: CHROMAFLO TECHNOLOGIES EUROPE B.V., Sittard (NL)

(72) Inventors: Peter Thommassen, Sittard (NL); Anne-Marja Uusitalo, Sittard (NL); Judith Roijen-Huijnen, Sittard (NL)

(73) Assignee: CHROMAFLO TECHNOLOGIES EUROPE B.V., Sittard (NL)

( * ) Notice: Subject to any disclaimer, the term of this patent is extended or adjusted under 35 U.S.C. 154(b) by 0 days.

(21) Appl. No.: 15/307,872

(22) PCT Filed: Apr. 29, 2015

(86) PCT No.: PCT/EP2015/059393
§ 371 (c)(1),
(2) Date: Oct. 31, 2016

(87) PCT Pub. No.: WO2015/165994
PCT Pub. Date: Nov. 5, 2015

(65) Prior Publication Data
US 2017/0051151 A1 Feb. 23, 2017

(30) Foreign Application Priority Data
May 1, 2014 (EP) .................................. 14166812

(51) Int. Cl.
*C09D 5/00* (2006.01)
*C09D 7/40* (2018.01)
(Continued)

(52) U.S. Cl.
CPC ........ *C09B 67/0092* (2013.01); *C09B 67/009* (2013.01); *C09B 67/0095* (2013.01);
(Continued)

(58) Field of Classification Search
CPC ... C09B 67/0092; C09B 67/0095; C09D 5/00; C09D 7/00; C09D 7/1216; C09D 17/00
See application file for complete search history.

(56) References Cited

U.S. PATENT DOCUMENTS 7,318,864 B2    1/2008  Reisacher et al.
7,597,439 B2 * 10/2009  Wexler ................ B41M 7/0027
                                                    347/101
(Continued)

FOREIGN PATENT DOCUMENTS

CN    1296040 C     5/2002
CN    101228236 A   7/2006
(Continued)

OTHER PUBLICATIONS

Moritz, T., et. al., Preparation of super soft granules from nanosized ceramic powders by spray freezing, Journal of Nanoparticle Research, vol. 4, 2002, pp. 439-448, XP 55204228A.
(Continued)

*Primary Examiner* — Pegah Parvini
(74) *Attorney, Agent, or Firm* — Hudak, Shunk & Farine Co. LPA

(57) ABSTRACT

A solid colorant including a. 30-97 wt % of a pigment, b. less than 5 wt % of a solvent c. 3-40 wt % surfactants and wherein: the ratio S/A [Std dev of the particle size distribution/average particle size] of the solid colorant is <25%, preferably <22% and more preferably <20%, wherein wt % is relative to the total weight of the solid colorant, and wherein the particle size distribution is determined with light scattering with fully automated image analysis according to ISO 13322-1 Static image analysis First edition 2004 Dec. 1 by the use of the OCCHIO ZEPHYR ESR analyzer. A process for making the solid colorant, and the use of the solid colorant for tinting base paints by volumetric dosing of the solid colorant to the base paint.

18 Claims, 3 Drawing Sheets

PSD for Yellow Oxide, solid colorant made with method B (according to the invention)

(51) Int. Cl.
*C09D 7/41* (2018.01)
*C09D 7/61* (2018.01)
*C09D 17/00* (2006.01)
*F26B 5/06* (2006.01)
*C09B 67/42* (2006.01)
*C09B 67/46* (2006.01)

(52) U.S. Cl.
CPC ............... *C09D 5/00* (2013.01); *C09D 7/41* (2018.01); *C09D 7/61* (2018.01); *C09D 7/69* (2018.01); *C09D 17/00* (2013.01); *C09D 17/003* (2013.01); *C09D 17/004* (2013.01); *F26B 5/065* (2013.01)

(56) References Cited

U.S. PATENT DOCUMENTS

| | | |
|---|---|---|
| 2001/0055639 A1 | 12/2001 | Moritz et al. |
| 2004/0147606 A1 | 7/2004 | Onuki et al. |
| 2005/0080171 A1 | 4/2005 | Reisacher et al. |
| 2008/0190319 A1* | 8/2008 | Reisacher ............ C08K 5/0008 106/31.86 |
| 2010/0258034 A1 | 10/2010 | Reisacher et al. |
| 2011/0262654 A1 | 10/2011 | Yates et al. |
| 2015/0274977 A1 | 10/2015 | Reisacher et al. |

FOREIGN PATENT DOCUMENTS

| | | |
|---|---|---|
| CN | 101896257 A | 12/2008 |
| DE | 199 14 329 A1 | 10/2000 |
| EP | 0 191 125 A1 | 8/1986 |
| EP | 1 103 173 A1 | 5/2001 |
| EP | 1 474 485 B1 | 5/2011 |
| WO | 00 47681 A1 | 8/2000 |
| WO | 2009 074576 A2 | 6/2009 |

OTHER PUBLICATIONS

Notification of Office Action, Chinese Application No. 201580028190.0, dated Jun. 5, 2018.

* cited by examiner

Fig. 1: PSD for Yellow Oxide, solid colorant made with method A (spray drying)

Fig. 2: PSD for Yellow Oxide, solid colorant made with method B (according to the invention)

SOLID COLORANT FOR TINTING PAINT

FIELD OF THE INVENTION

The invention relates to solid colorants for tinting paint compositions, a method to prepare the solid colorants and use of the solid colorants.

BACKGROUND OF THE INVENTION

Architectural paint and stain manufacturers typically distribute premixed paints and stains in a small number of popular colors. To accommodate consumer desires and enable matching of existing painted or stained surfaces, manufacturers typically also distribute a set of tintable paints and several concentrated colorants. These are combined at point-of-sale outlets using colorant dispensing and shaker mixing equipment to make small batch lots of custom-tinted paint in a much larger array of colors than the limited color array available in premixed products.

The custom color systems from different paint manufacturers tend to have somewhat similar components. For example, a typical custom color paint system may employ several (e.g., 2 to 4) tintable paints ranging for example from a white base intended to accept at most a small quantity of colorant, to a relatively unpigmented clear base intended to accept a much larger quantity of colorant. Base paints may employ various binders (e.g., natural or synthetic resins), binder forms (e.g., solution polymers or latex polymers) and vehicles (e.g., solvent-borne or water-borne versions), and may provide various dried surface finishes (e.g., matt, semi-gloss or gloss finishes). Some manufacturers also sell colored base paints (e.g. a red, a blue and yellow colored base) which are intended to be combined with additional colorant(s) when one coat hiding power is desired for strongly-tinted custom paint shades. The colorants in custom color paint or stain systems may, for example, be volumetrically metered from a multiple-colorant dispensing station, with 12 colorants for paint or stain typically being employed in colorant dispensing stations for the U.S. market, and more (e.g., 16 or 24 colorants) sometimes being employed in other markets.

WO2010091418 describes liquid colorants that can be used in tinting systems. Disadvantage of liquid tinting systems is the difficulty to keep the working places clean and prevent infection of mould, the phase separation of the pigments in the liquid tinting systems, which will result in inaccurate dosing of pigments and fouling of the dosing system, and the problem of evaporation of solvents, which will change the concentration of the liquid colorant and the viscosity of the liquid colorant, making the dosing inaccurate.

WO0047681, EP1474485, U.S. Pat. No. 7,318,864 and WO09074576 disclose solid pigment preparations that can be used to color paints. These solid pigment preparations are prepared in a spray drying process.

US2001/0055639 describes a process to prepare a granular product. A suspension of particles is sprayed by means of a two-fluid nozzle into liquid nitrogen. The granular product has a broad or even bimodal particle size distribution.

US2011/0262654 describes a process for making porous particles, by electrospraying a suspension of particles, collecting droplets in liquid nitrogen and then drying in vacuum. Irregular particles have been obtained.

EP0191125 describes a method to prepare solid particles by shock cooling of particles and subsequent drying of the particles by sublimation.

DE19914329 describes a method to prepare solid particles by spray drying.

EP1103173 describes a method to prepare solid pigment particles by spray drying.

All above methods prepare particles which have either an irregular shape, and/or a broad particle size distribution.

The particles prepared in a spray drying process have a number of disadvantages. They show a broad particle size distribution, contain a considerable amount of dust and turn out to be mechanically instable. The broad particle size distribution makes it necessary to include a sieving step in the process to produce the particles, which makes the process expensive and results in a low yield of suitable product. Even after sieving, the particle size distribution is still broad which causes several problems. The smaller particles (typically having a particle size below 100 µm) tend to agglomerate to aggregates that are mechanically instable and show a variable bulk density. After agglomeration the bulk density may be locally increased. At the same time small particles and large particles may show percolation, which means that the particles separate from each other: small particles drift to the lower part of a container, while larger particles tend to float on top of the smaller particles. This separation causes differences in bulk density and gives an irregular flow behavior of the particles. Moreover the particles obtained in a spray drying process do not have a regular circular shape: many particles have the shape of a 'donut'. The 'donut' shape causes an increased cohesion between the particles, which has a negative influence on the flowability of the particles and influences the bulk density.

The solid pigment preparations of the prior art need to be dosed to base paint compositions in a gravimetric manner, due to the broad particle size distribution and other properties. Gravimetric dosing is usually carried out by weighing a container comprising the base paint compositions and determining the addition of the pigment preparation to the total weight of the base paint. This is complex, especially when only small amounts of solid pigment preparations should be dosed. In such cases, small variations in the environment (like vibrations and air turbulence) can cause large measuring errors, which will generate colored paint compositions that are out of specification in color. Also gravimetric measurement of the pigments means that all pigments should be dosed in a sequential manner, since each pigment should be dosed individually.

There is a need for solid colorants that can be used in tinting systems and can overcome one or more of the problems associated with the present tinting systems.

After extensive studies, the inventors solved the above mentioned problems and developed new solid colorants that can be favorably used in tinting systems for tinting base paint compositions.

SUMMARY OF THE INVENTION

The invention relates to a solid colorant comprising
a) 30-97 wt % of a pigment
b) less than 5 wt % of a solvent
c) 3-40 wt % surfactants
and wherein the ratio S/A [standard deviation of the particle size distribution/average particle size] of the solid colorant is <25%, preferably <22% and more preferably <20%, and wherein wt % is relative to the total weight of the solid colorant, and wherein the particle size distribution is determined with light scattering with fully automated image analysis according to ISO 13322-1 Static image analysis First edition 2004 December 1 by the use of the OCCHIO ZEPHYR ESR analyzer.

Preferably the solid colorant has an average particle size between 400 and 1400 micron (μm), preferably between 500 and 1300 μm, more preferably between 600 and 1000 μm.

The particle size distribution (PSD), the standard deviation (Std dev) of the PSD and average particle size (=average sphere diameter) are determined with light scattering with fully automated image analysis according to ISO 13322-1 Static image analysis First edition 2004 Dec. 1 by the use of the OCCHIO ZEPHYR ESR analyzer.

In a preferred embodiment the solid colorant comprises
a) 50-95 wt % of a pigment
b) Less than 3 wt % of a solvent
c) 5-30 wt % surfactants
d) 0.1-5 wt % additives
e) 0-20 wt % colorless filler
f) 0-10 wt % binder wherein the ratio S/A [Std dev of the particle size distribution/average particle size] of the solid colorant is <25%, preferably <22% and more preferably <20%, wherein the solid colorant has an average particle size between 400 and 1400 μm, preferably between 500 and 1300 μm, more preferably between 600 and 1000 μm, and wherein wt % is relative to the total weight of the solid colorant.

The solid colorant according to the invention has a surprisingly narrow particle size distribution relative to solid colorants prepared according to spray drying as known from the prior art. Moreover the colorants show a fast deployment of the intrinsic color strength which is an indication of a fast dispersion into aqueous or organic solvent based base paints to obtain tinted base paints. The solid colorant according to the present invention has a high mechanical stability and a narrow particle size distribution, which makes it possible to add the solid colorant to a base paint in a volumetric manner, instead to the known gravimetric dosing of solid colorants to base paint compositions.

The amount of solid material in the solid colorants is determined with Thermogravimetric Analysis (TGA) method using Kern MLS analyzer equipment. The solid content (%) is 100%−moisture content (%). The solid material in the solid colorants consists essentially of pigments, colorless filler materials and surfactants. Preferably the amount of solid material ranges between 95 and 99.9 wt %, more preferably between 98 and 99.9 wt %, relative to the weight of the solid colorant.

A colorant is any substance (e.g. a dye, pigment, ink, or paint) that impacts color or modifies the hue of something else.

A solid colorant is a solid composition, which can be added to a point-of sale container whose interior volume is largely (e.g. two thirds of the container volume or more) but not completely already filled with a base paint so as to alter the hue or lightness of such base paint, and which composition contains pigment or dye.

The pigments used in the solid colorants according to the invention can be inorganic or organic in nature and can, for example, be chosen from metal oxides formed from a variety of metals, e.g., from aluminum, antimony, bismuth, boron, chromium, cobalt, gallium, indium, iron, lanthanum, lithium, magnesium, manganese, molybdenum, neodymium, nickel, niobium, silicon, tin, titanium, vanadium or zinc. It will be appreciated that the pigment component may also comprise mixtures of various organic or various inorganic pigments or mixtures of organic and inorganic pigments.

The pigment component may comprise one or more pigments. It will be appreciated that mixtures of two or more pigments can also be used.

The pigments are present in finely divided form. Accordingly, their median particle size is typically in the range from 0.01 to 5 μm.

The inorganic pigments used can be chromatic, black and white pigments (color pigments) and also luster pigments. Typical organic pigments are chromatic and black pigments.

Examples of suitable organic pigments are: monoazo pigments: C.I. Pigment Brown 25; C.I. Pigment Orange 5, 13, 36, 38, 64 and 67; C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251; C.I. Pigment Yellow 1, 3, 62, 65, 73, 74, 97, 120, 151, 154, 168, 181, 183 and 191; C.I. Pigment Violet 32; disazo pigments: C.I. Pigment Orange 16, 34,44 and 72; C.I. Pigment Yellow 12, 13, 14, 16, 17, 81, 83, 106, 113, 126, 127, 155, 174, 176, 180 and 188; disazo condensation pigments: C.I. Pigment Yellow 93, 95 and 128; C.I. Pigment Red 144, 166, 214, 220, 221, 242 and 262; C.I. Pigment Brown 23 and 41; anthanthrone pigments: C.I. Pigment Red 168; anthraquinone pigments: C.I. Pigment Yellow 147, 177 and 199; C.I. Pigment Violet 31; anthrapyrimidine pigments: C.I. Pigment Yellow 108; quinacridone pigments: C.I. Pigment Orange 48 and 49; C.I. Pigment Red 122, 202, 206 and 209; C.I. Pigment Violet 19; quinophthalone pigments: C.I. Pigment Yellow 138; diketopyrrolopyrrole pigments: C.I. Pigment Orange 71, 73 and 81; C.I. Pigment Red 254, 255, 264, 270 and 272; dioxazine pigments: C.I. Pigment Violet 23 and 37; C.I. Pigment Blue 80; flavanthrone pigments: C.I. Pigment Yellow 24; indanthrone pigments: C.I. Pigment Blue 60 and 64; isoindoline pigments: C.I. Pigment Orange 61 and 69; C.I. Pigment Red 260; C.I. Pigment Yellow 139 and 185; isoindolinone pigments: C.I. Pigment Yellow 109, 110 and 173; isoviolanthrone pigments: C.I. Pigment Violet 31; metal complex pigments: C.I. Pigment Red 257; C.I. Pigment Yellow 117, 129, 150, 153 and 177; C.I. Pigment Green 8; perinone pigments: C.I. Pigment Orange 43; C.I. Pigment Red 194perylene pigments: C.I. Pigment Black 31 and 32; C.I. Pigment Red 123, 149, 178, 179, 190 and 224; C.I. Pigment Violet 29; phthalocyanine pigments: C.I. Pigment Blue 15, 15:1, 15:2, 15:3, 15:4, 15:6 and 16; C.I. Pigment Green 7 and 36; pyranthrone pigments: C.I. Pigment Orange 51; C.I. Pigment Red 216; pyrazoloquinazolone pigments: C.I. Pigment Orange 67; C.I. Pigment Red 251; thioindigo pigments: C.I. Pigment Red 88 and 181; C.I. Pigment Violet 38; triarylcarbonium pigments: C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black); C.I. Pigment Yellow 101 (aldazine yellow); C.I. Pigment Brown 22.

Examples of suitable inorganic pigments are: white pigments: titanium dioxide (C.I. Pigment White 6), zinc white, pigment grade zinc oxide; zinc sulfide, lithopone; black pigments: iron oxide black (C.I. Pigment Black 11), iron manganese black, spinel black (C.I. Pigment Black 27); carbon black (C.I. Pigment Black 7); chromatic pigments: chromium oxide, chromium oxide hydrate green; chrome green (C.I. Pigment Green 48); cobalt green (C.I. Pigment Green 50); ultramarine green; cobalt blue (C.I. Pigment Blue 28 and 36; al. Pigment Blue 72); ultramarine blue; manganese blue; ultramarine violet; cobalt violet and manganese violet; red iron oxide (C.I. Pigment Red 101); cadmium sulfoselenide (C.I. Pigment Red 108); cerium sulfide (C.I. Pigment Red 265); molybdate red (C.I. Pigment Red 104);

ultramarine red; brown iron oxide (C.I. Pigment Brown 6 and 7), mixed brown, spinel phases and corundum phases (C.I. Pigment Brown 29, 31, 33, 34, 35, 37, 39 and 40), chromium titanium yellow (C.I. Pigment Brown 24), chrome orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).

Luster pigments are platelet-shaped pigments having a monophasic or polyphasic construction whose color play is marked by the interplay of interference, reflection and absorption phenomena. Examples are aluminum platelets and aluminum, iron oxide and mica platelets bearing one or more coats, especially of metal oxides.

The pigments are preferably chosen from the oxides/hydroxides pigments, mixed metal oxides pigments, carbon black pigments, monoazos, naphtol AS, benzimidazolone, isoindolin(one)e and polycyclic pigments.

The solvent component can consist of one or more solvents which are preferably at least partly miscible.

Preferred solvents are water, alcohols and glycols, such as ethylene glycol, propylene glycol, diethylene glycol, triethylene glycol, higher glycols and mixtures thereof. Preferably the solvent contains water.

Preferably the amount of solvent in the solid colorant is low, for example less than 5 wt %, preferably less than 3 wt % more preferably less than 2.5 wt %, relative to the total weight of the solid colorant.

The surfactant component in the solid colorant may comprise one or more surfactants. The choice of surfactant type is especially dependent on the choice of pigment and also the desired color.

Surfactants are compounds that lower the surface tension of a liquid, the interfacial tension between two liquids, or the interfacial tension between a liquid and a solid. In solutions this behavior is known as wetting, and it occurs as a result of surfactants adsorbing to the air/water interface. Surfactants may act as detergents, wetting agents, emulsifiers, foaming agents, and dispersants. Surfactants are used to stabilize the dispersion of polymer particles during emulsion polymerization in paints and other applications. The mechanical stability, freeze-thaw stability and shelf-life of paints are all improved by the addition of surfactants.

Useful surfactants are in particular nonionic and/or anionic water-soluble surface-active additives. Particularly suitable nonionic surfactants are based on polyethers. As well as the unmixed polyalkylene oxides, preferably $C_2$-$C_4$-alkylene oxides and phenyl-substituted $C_2$-$C_4$-alkylene oxides, especially polyethylene oxides, polypropylene oxides and poly(phenylethylene oxide)s, it is in particular block copolymers, especially polymers having polypropylene oxide and polyethylene oxide blocks or poly(phenylethylene oxide) and polyethylene oxide blocks, and also random copolymers of these alkylene oxides which are suitable. These polyalkylene oxides are obtainable by polyaddition of alkylene oxides onto starter molecules such as saturated or unsaturated aliphatic and aromatic alcohols, saturated or unsaturated aliphatic and aromatic amines, saturated or unsaturated aliphatic carboxylic acids and carboxamides and also aromatic carboxamides and sulfonamides. Aromatic starter molecules may be substituted by $C_1$-$C_2O$-alkyl or $C_7$-$C_{30}$-aralkyl. It is customary to use from 1 to 300 mol and preferably from 3 to 150 mol of alkylene oxide per mole of starter molecule, although in the case of aromatic starter molecules the amounts of alkylene oxide are in particular in the range from 2 to 100 mol, preferably in the range from 5 to 50 mol and especially in the range from 10 to 30 mol. The polyaddition products may have a terminal OH group or be end group capped, being in the form of $C_1$-$C_6$-alkyl ethers for example.

Suitable aliphatic alcohols comprise in general from 6 to 26 carbon atoms and preferably from 8 to 18 carbon atoms and can have an unbranched, branched or cyclic structure. Examples are octanol, nonanol, decanol, isodecanol, undecanol, dodecanol, 2-butyloctanol, tridecanol, isotridecanol, tetradecanol, pentadecanol, hexadecanol (cetyl alcohol), 2-hexyldecanol, heptadecanol, octadecanol (stearyl alcohol), 2-heptyl-undecanol, 2-octyldecanol, 2-nonyltridecanol, 2-decyltetradecanol, oleyl alcohol and 9-octadecenol and also mixtures of these alcohols, such as $C_8/C_10$, $C_{13}/C_15$ and $C_{16}/C_18$ alcohols, and cyclopentanol and cyclohexanol. Of particular interest are the saturated and unsaturated fatty alcohols obtained from natural raw materials by lipolysis and reduction and the synthetic fatty alcohols from the oxo process. The alkylene oxide adducts with these alcohols typically have average molecular weights $M_n$ from 200 to 5000.

Examples of the above-mentioned aromatic alcohols include not only unsubstituted phenol and α- and β-naphthol but also the alkyl-substituted products, which are substituted in particular by $C_1$-$C_{12}$-alkyl, preferably $C_4$-$C_{12}$-alkyl or $C_1$-$C_4$-alkyl, and the aralkyl-substituted products, in particular $C_7$-$C_{30}$-aralkyl-substituted phenol, such as hexylphenol, heptylphenol, octylphenol, nonylphenol, isononylphenol, undecylphenol, dodecylphenol, di- and tributylphenol and dinonylphenol, and also bisphenol A and its reaction products with styrene, in particular bisphenol A substituted by a total of 4 phenyl-1-ethyl radicals in the ortho positions to the two OH groups.

Suitable aliphatic amines correspond to the above-mentioned aliphatic alcohols. Again of particular importance here are the saturated and unsaturated fatty amines which preferably have from 14 to 20 carbon atoms. Examples of aromatic amines are aniline and its derivatives. Useful aliphatic carboxylic acids include especially saturated and unsaturated fatty acids which preferably comprise from 14 to 20 carbon atoms and fully hydrogenated, partially hydrogenated and unhydrogenated resin acids and also polyfunctional carboxylic acids, for example dicarboxylic acids, such as maleic acid. Suitable carboxamides are derived from these carboxylic acids. As well as alkylene oxide adducts with monofunctional amines and alcohols it is alkylene oxide adducts with at least bifunctional amines and alcohols which are of very particular interest.

The at least bifunctional amines preferably have from 2 to 5 amine groups and conform in particular to the formula $H_2N$—$(R^1$—$NR^2)_n$—$H(R^1$: $C_2$-$C_6$-alkylene; $R^2$: hydrogen or $C_1$-$C_6$-alkyl; n: 1-5). Specific examples are: ethylenediamine, diethylenetriamine, triethylene-tetramine, tetraethylenepentamine, 1,3-propylenediamine, dipropylenetriamine, 3-amino-1-ethyleneaminopropane, hexamethylenediamine, dihexamethylenetriamine, 1,6-bis(3-aminopropylamino) hexane and N-methyldipropylenetriamine, of which hexamethylenediamine and diethylenetriamine are more preferable and ethylenediamine is most preferable.

These amines are preferably reacted first with propylene oxide and then with ethylene oxide. The ethylene oxide content of the block copolymers is typically about 10% to 90% by weight. The average molecular weights $M_n$ of the block copolymers based on polyfunctional amines are generally in the range from 1000 to 40.000 and preferably in the range from 1500 to 30.000.

The at least bifunctional alcohols preferably have from two to five hydroxyl groups. Examples are $C_2$-$C_6$-alkylene glycols and the corresponding di- and polyalkylene glycols, such as ethylene glycol, 1,2-propylene glycol, 1,3-propylene glycol, 1,2-butylene glycol, 1,4-butylene glycol, 1,6-hexylene glycol, dipropylene glycol and polyethylene glycol, glycerol and pentaerythritol, of which ethylene glycol and polyethylene glycol are more preferable and propylene glycol and dipropylene glycol are most preferable. Particularly preferred alkylene oxide adducts with at least bifunctional alcohols have a central polypropylene oxide block, i.e. are based on a propylene glycol or polypropylene glycol which is initially reacted with further propylene oxide and then with ethylene oxide. The ethylene oxide content of the block copolymers is typically in the range from 10% to 90% by weight. The average molecular weights $M_n$ of the block copolymers based on polyhydric alcohols are generally in the range from 1000 to 20.000 and preferably in the range from 1000 to 15.000.

Such nonionic surface-active additives are known and commercially available for example under the names of Tetronic®, Pluronic® and Pluriol® (BASF), Atlas®, Symperonic, (Uniquema), Emulgator WN and 386 (Lanxess) and also Rhodasurf, Soprophor® (Rhodia), Genopol (Clariant), Dowfax (Dow), Berol, Duomeen, Ethomeen (Akzo), Ethylan, (Akcros).

Examples of the water-soluble anionic surface-active agents which are particularly useful are additives based on polymers of ethylenically unsaturated carboxylic acids, additives based on polyurethanes, additives based on acidic phosphoric, phosphonic, sulfuric and/or sulfonic esters of the abovementioned polyethers and additives based on polycondensation products of aromatic sulfonic acids and formaldehyde.

It will be appreciated that it is also possible to use mixtures of a plurality of additives, i.e., not only mixtures of various nonionic additives but also mixtures of various anionic additives and also mixtures of nonionic and anionic additives.

Useful water-soluble anionic surface-active additives based on polymers of unsaturated carboxylic acids are particularly additives from the group of the homo- and copolymers of ethylenically unsaturated monocarboxylic acids and/or ethylenically unsaturated dicarboxylic acids, which may each further comprise interpolymerized vinyl monomers comprising no acid function, the alkoxylation products of these homo- and copolymers and the salts of these homo- and copolymers and their alkoxylation products.

As examples of carboxyl-containing monomers and of vinyl monomers there may be mentioned: acrylic acid, methacrylic acid and crotonic acid; maleic acid, maleic anhydride, maleic monoesters, maleic monoamides, reaction products of maleic acid with diamines, which may be oxidized to form derivatives comprising amine oxide groups, and fumaric acid, of which maleic acid, maleic anhydride and maleic monoamides are preferred; vinylaromatics, such as styrene, methylstyrene and vinyltoluene; ethylene, propylene, isobutene, diisobutene and butadiene; vinyl ethers, such as polyethylene glycol monovinyl ether; vinyl esters of linear or branched monocarboxylic acids, such as vinyl acetate and vinyl propionate; alkyl esters and aryl esters of ethylenically unsaturated monocarboxylic acids, in particular acrylic and methacrylic esters, such as methyl acrylate, ethyl acrylate, propyl acrylate, isopropyl acrylate, butyl acrylate, pentyl acrylate, hexyl acrylate, 2-ethylhexyl acrylate, nonyl acrylate, lauryl acrylate, hydroxyethyl acrylate, methyl methacrylate, ethyl methacrylate, propyl methacrylate, isopropyl methacrylate, butyl methacrylate, pentyl methacrylate, hexyl methacrylate, 2-ethylhexyl methacrylate, nonyl methacrylate, lauryl methacrylate and hydroxyethyl methacrylate and also phenyl acrylate, phenyl methacrylate, naphthyl acrylate, naphthyl methacrylate, benzyl acrylate and benzyl methacrylate; dialkyl esters of ethylenically unsaturated dicarboxylic acids, such as dimethyl maleate, diethyl maleate, dipropyl maleate, diisopropyl maleate, dibutyl maleate, dipentyl maleate, dihexyl maleate, di-2-ethylhexyl maleate, dinonyl maleate, dilauryl maleate, di-2-hydroxyethyl maleate, dimethyl fumarate, diethyl fumarate, dipropyl fumarate, diisopropyl fumarate, dibutyl fumarate, dipentyl fumarate, dihexyl fumarate, di-2-ethylhexyl fumarate, dinonyl fumarate, dilauryl fumarate, di-2-hydroxyethyl fumarate; vinylpyrrolidone; acrylonitrile and methacrylonitrile; of which styrene, isobutene, diisobutene, acrylic esters and polyethylene glycol monovinyl ether are preferred.

Polyacrylic acids in particular are to be mentioned as examples of preferred homo-polymers of these monomers.

The copolymers of the monomers mentioned may be constructed of two or more and in particular three different monomers. The copolymers may be random, alternating, block or graft. Preferred copolymers are styrene-acrylic acid, acrylic acid-maleic acid, acrylic acid-methacrylic acid, butadiene-acrylic acid, isobutene-maleic acid, diisobutene-maleic acid and styrene-maleic acid copolymers, which may each comprise acrylic esters and/or maleic esters as additional monomeric constituents.

Preferably, the carboxyl groups of nonalkoxylated homo- and copolymers are wholly or partly present in salt form in order that solubility in water may be ensured. The alkali metal salts, such as sodium and potassium salts, and the ammonium salts are suitable for example.

The nonalkoxylated polymeric additives will typically have average molecular weights $M_w$ in the range from 900 to 250 000. The molecular weight ranges particularly suitable for the individual polymers depend on their composition, of course. The molecular weight data which follow for various polymers are given by way of example: polyacrylic acids: $M_w$ from 900 to 250 000; styrene-acrylic acid copolymers: $M_w$ from 1000 to 50 000; acrylic acid-methacrylic acid copolymers: $M_w$ from 1000 to 250 000; acrylic acid-maleic acid copolymers: $M_w$ from 2000 to 70 000. As well as these homo- and copolymers themselves, their alkoxylation products are also of particular interest for use as additives.

These alkoxylation products are in particular polymers formed by partial to (if possible) complete esterification with polyether alcohols. The degree of esterification of these polymers is generally in the range from 30 to 80 mol %.

Useful polyether alcohols for the esterification are in particular alcohols such as ethanol, propanol, isopropanol, butanol, fatty alcohols, the polyether alcohols themselves, preferably polyethylene glycols and polypropylene glycols, and also their unilaterally end-capped derivatives, in particular the corresponding monoethers, such as monoaryl ethers, for example monophenyl ethers, and in particular mono-$C_1$-$C_2$6-alkyl ethers, for example ethylene and propylene glycols etherified with fatty alcohols, and the polyetheramines which are preparable for example by conversion of a terminal OH group of the corresponding polyether alcohols or by polyaddition of alkylene oxides onto preferably primary aliphatic amines. Preference here is given to polyethylene glycols, polyethylene glycol monoethers and polyetheramines. The average molecular weights $M_n$ of the polyether alcohols used and of their derivatives are typically in the range from 200 to 10000.

Specific surface-active properties can be achieved for the additives by varying the ratio of polar to apolar groups.

These anionic surface-active additives are likewise known and commercially available, for example under the names Sokalan® (BASF), Joncryl® (Johnson Polymer), Alcosperse® (Alco), Geropon® (Rhodia), Good-Rite® (Goodrich), Neoresin® (Avecia), Orotan® and Morez® (Rohm & Haas), Disperbyk® (Byk) and also Tegospers® (Degussa).

Useful anionic surface-active additives for inclusion in these pigment preparations further include polyurethane-based additives.

For the purposes of the present invention, the term "polyurethane" shall comprehend not just the pure reaction products of polyfunctional isocyanates with isocyanate-reactive hydroxyl-comprising organic compounds, but also these reaction products after additional functionalization through the addition of further isocyanate-reactive compounds, examples being carboxylic acids bearing primary or secondary amino groups. These additives are notable for their low ionic conductivity and their neutral pH compared with other surface-active additives. Useful polyfunctional isocyanates for preparing the additives are in particular diisocyanates, but compounds having three or four isocyanate groups can be used as well. Both aromatic and aliphatic isocyanates may be used.

Examples of preferred di- and triisocyanates are: 2,4-tolylene diisocyanate (2,4-TDI), 4,4'-diphenylmethane diisocyanate (4,4'-MDI), para-xylylene diisocyanate, 1,4-diisocyanatobenzene, tetramethylxylylene diisocyanate (TMXDI), 2,4'-diphenyl-methane diisocyanate (2,4'-MDI) and triisocyanatotoluene and also isophorone diisocyanate (IPDI), 2-butyl-2-ethylpentamethylene diisocyanate, tetramethylene diisocyanate, hexamethylene diisocyanate, dodecamethylene diisocyanate, 2,2-bis(4-isocyanatocyclohexyl)propane, trimethylhexane diisocyanate, 2-isocyanatopropylcyclohexyl isocyanate, 2,4,4-trimethylhexamethylene diisocyanate, 2,2,4-trimethylhexamethylene diisocyanate, 2,4'-methylenebis(cyclohexyl) diisocyanate, cis-cyclohexane 1,4-diisocyanate, trans-cyclohexane 1,4-diisocyanate and 4-methylcyclohexane 1,3-diisocyanate (H-TDI).

It will be appreciated that mixtures of isocyanates may also be used. There may be mentioned by way of example: mixtures of structural isomers of 2,4-tolylene diisocyanate and triisocyanatotoluene, examples being mixtures of 80 mol % of 2,4-tolylene diisocyanate and 20 mol % of 2,6-tolylene diisocyanate; mixtures of cis- and trans-cyclohexane 1,4-diisocyanate; mixtures of 2,4- or 2,6-tolylene diisocyanate with aliphatic diisocyanates, such as hexamethylene diisocyanate and isophorone diisocyanate.

Useful isocyanate-reactive organic compounds preferably include compounds having at least two isocyanate-reactive hydroxyl groups per molecule. Compounds useful as, however, further include compounds having only one isocyanate-reactive hydroxyl group per molecule. These monofunctionalized compounds can partly or else wholly replace the compounds which comprise at least two isocyanate-reactive hydroxyl groups per molecule, in the reaction with the polyisocyanate.

Examples of particularly preferred isocyanate-reactive compounds having at least two isocyanate-reactive hydroxyl groups per molecule will now be recited.

They are polyetherdiols, polyesterdiols, lactone-based polyesterdiols, diols and triols of up to 12 carbon atoms, dihydroxy carboxylic acids, dihydroxy sulfonic acids, dihydroxy phosphonic acids, polycarbonatediols, polyhydroxyolefins and polysiloxanes having on average at least two hydroxyl groups per molecule.

Useful polyetherdiols include for example homo- and copolymers of $C_2$-$C_4$-alkylene oxides, such as ethylene oxide, propylene oxide and butylene oxide, tetrahydrofuran, styrene oxide and/or epichlorohydrin, which are obtainable in the presence of a suitable catalyst, an example being boron trifluoride. Further useful polyetherdiols are obtainable by (co)polymerization of these compounds in the presence of a starter having at least two acidic hydrogen atoms, examples of a starter being water, ethylene glycol, thioglycol, mercaptoethanol, 1,3-propanediol, 1,4-butanediol, 1,6-hexanediol, 1,12-dodecanediol, ethylenediamine, aniline or 1,2-di-(4-hydroxyphenyl)propane.

Examples of particularly suitable polyetherdiols are polyethylene glycol, polypropylene glycol, polybutylene glycol and polytetrahydrofuran and also copolymers thereof. The molecular weight $M_n$ of the polyetherdiols is preferably in the range from 250 to 5000 and more preferably in the range from 500 to 2500. Useful isocyanate-reactive compounds further include polyesterdiols (hydroxy polyesters), which are common knowledge.

Preferred polyesterdiols are the reaction products of diols with dicarboxylic acids or their reactive derivatives, examples being anhydrides or dimethyl esters. Useful dicarboxylic acids include saturated and unsaturated aliphatic and also aromatic dicarboxylic acids which may bear additional substituents, such as halogen. Preferred aliphatic dicarboxylic acids are saturated unbranched α,ω-dicarboxylic acids comprising from 3 to 22 and in particular from 4 to 12 carbon atoms.

Examples of particularly suitable dicarboxylic acids are: succinic acid, glutaric acid, adipic acid, suberic acid, azelaic acid, sebacic acid, 1,12-dodecanedicarboxylic acid, maleic acid, maleic anhydride, fumaric acid, itaconic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, terephthalic acid, dimethyl terephthalate and dimethyl isophthalate.

Useful diols include in particular saturated and unsaturated aliphatic and cycloaliphatic diols. The aliphatic α,ω-diols which are particularly preferred are unbranched and have from 2 to 12, in particular from 2 to 8 and especially from 2 to 4 carbon atoms. Preferred cycloaliphatic diols are derived from cyclohexane.

Examples of particularly suitable diols are: ethylene glycol, propylene glycol, 1,3-propanediol, 1,4-butanediol, 2-methylpropane-1,3-diol, 1,5-pentanediol, neopentyl glycol, 1,6-hexanediol, 1,8-octanediol, 1,10-decanediol, 1,12-dodecanediol, cis-but-2-ene-1,4-diol, trans-but-2-ene-1,4-diol, 2-butyne-1,4-diol, cis-1,4-di(hydroxymethyl)-cyclohexane and trans-14-di(hydroxymethyl)cyclohexane. The molecular weight $M_n$ of the polyesterdiols is preferably in the range from 300 to 5000.

Lactone-based polyesterdiols useful as an isocyanate-reactive compound are based in particular on aliphatic saturated unbranched ω-hydroxy carboxylic acids having from 4 to 22 and preferably from 4 to 8 carbon atoms. It is also possible to use branched ω-hydroxy carboxylic acids wherein one or more —$CH_2$— groups in the alkylene chain are replaced by —$CH(C_1$-$C_4$-alkyl)-.

Examples of preferred ω-hydroxy carboxylic acids are γ-hydroxybutyric acid and δ-hydroxyvaleric acid.

It will be appreciated that the abovementioned diols may likewise be used as isocyanate-reactive compounds, in which case the same preferences as above apply.

Triols, in particular triols having from 3 to 12 carbon atoms and especially triols having from 3 to 8 carbon atoms are likewise useful as isocyanate-reactive compounds. Trimethylolpropane is an example of a particularly suitable triol. Dihydroxy carboxylic acids useful as isocyanate-reactive compounds are in particular aliphatic saturated dihydroxy carboxylic acids which preferably comprise 4 to 14 carbon atoms. Dimethylolpropionic acid (DMPA) is a particularly preferred example of these dihydroxy carboxylic acids.

Useful isocyanate-reactive compounds further include the corresponding dihydroxy sulfonic acids and dihydroxy phosphonic acids, such as 2,3-dihydroxypropanephosphonic acid. Dihydroxy carboxylic acid as used herein shall also comprise compounds comprising more than one carboxyl function (or as the case may be anhydride or ester function). Such compounds are obtainable by reaction of dihydroxy compounds with tetracarboxylic dianhydrides, such as pyromellitic dianhydride or cyclopentanetetra-carboxylic dianhydride, in a molar ratio from 2:1 to 1.05:1 in a polyaddition reaction, and preferably have an average molecular weight $M_n$ in the range from 500 to 10 000.

Examples of useful polycarbonatediols are the reaction products of phosgene with an excess of diols, in particular unbranched saturated aliphatic α,ω-diols having from 2 to 12, in particular from 2 to 8 and especially from 2 to 4 carbon atoms.

Polyhydroxyolefins useful as an isocyanate-reactive compound are in particular α,ω-dihydroxyolefins, and α,ω-dihydroxybutadienes are preferred.

Furthermore the polysiloxanes useful as an isocyanate-reactive compound comprise on average at least two hydroxyl groups per molecule. Particularly suitable polysiloxanes comprise on average from 5 to 200 silicon atoms (number average) and are in particular substituted by $C_1$-$C_{12}$-alkyl groups, in particular methyl groups.

Examples of isocyanate-reactive compounds comprising just one isocyanate-reactive hydroxyl group are in particular aliphatic, cycloaliphatic, araliphatic or aromatic monohydroxy carboxylic acids and monohydroxy sulfonic acids.

It is possible in this connection, as well as the aforementioned isocyanate-reactive compounds, to add further compounds having isocyanate-reactive groups, for example dithiols, thio alcohols, such as thioethanol, amino alcohols, such as ethanolamine and N-methylethanolamine, or diamines, such as ethylenediamine, and to thereby prepare polyurethanes which, as well as urethane groups, additionally bear isocyanurate groups, allophanate groups, urea groups, biuret groups, uretidione groups or carbodiimide groups. Further examples of such isocyanate-reactive compounds are aliphatic, cycloaliphatic, araliphatic or aromatic carboxylic acids and sulfonic acids which bear at least two primary and/or secondary amino groups.

It will be appreciated that it is also possible to add corresponding compounds having just one isocyanate-reactive group, examples being monoalcohols, primary and secondary monoamines, monoamino carboxylic and sulfonic acids and mercaptans. Customary use levels range up to 10 mol %, based on.

Preferably, some or all of the carboxyl groups of the reaction products are in salt form in order that solubility in water may be ensured. Useful salts include for example alkali metal salts, such as sodium and potassium salts, and ammonium salts. Typically, the additives have average molecular weights $M_w$ in the range from 500 to 250 000.

Specific surface-active properties can be achieved for the additives by varying the ratio of polar to apolar groups. Such anionic surface-active additives are known and commercially available, for example under the name Borchi® GEN SN95 (Borchers).

Water-soluble anionic surface-active additives based on acidic phosphoric, phosphonic, sulfuric and/or sulfonic esters of polyethers are based in particular on the reaction products of the above-recited polyethers with phosphoric acid, phosphorus pentoxide and phosphonic acid on the one hand and sulfuric acid and sulfonic acid on the other. In the reaction, the polyethers are converted into the corresponding phosphoric mono- or diesters and phosphonic esters on the one hand and the sulfuric monoesters and sulfonic esters on the other. These acidic esters are preferably present in the form of water-soluble salts, in particular as alkali metal salts, especially sodium salts, and ammonium salts, but can also be used in the form of the free acids.

Preferred phosphates and phosphonates are derived especially from alkoxylated, in particular ethoxylated, fatty and oxo alcohols, alkylphenols, fatty amines, fatty acids and resin acids, and preferred sulfates and sulfonates are based in particular on alkoxylated, especially ethoxylated, fatty alcohols, alkylphenols and amines, including polyfunctional amines, such as hexamethylenediamine.

Such anionic surface-active additives are known and commercially available for example under the names of Nekal® (BASF), Tamol® (BASF), Crodafos® (Croda), Rhodafac® (Rhodia), Maphos® (BASF), Texapon® (Cognis), Empicol® (Albright & Wilson), Matexil® (ICI), Soprophor® (Rhodia) and Lutensit® (BASF).

Water-soluble anionic additives based on aromatic sulfonic acids and formaldehyde are based in particular on naphthalenesulfonic acid and are likewise preferably used in salt form, in particular as sodium salt. Their average molecular weight Mw is typically in the range from 4000 to 15 000.

The additives are likewise known and are for example commercially available under the name of Tamol® (BASF).

The amount of surfactants is between 3 and 40 wt %, preferably between 5 and 30, more preferably between 10 and 25 wt %, relative to the total weight of the solid colorant.

The solid colorant may comprise one or more additives. The choice of additive type may depend on the choice of pigment and also the desired color.

The additives used in the solid colorant according to the invention can be for example defoaming agents, binders, biocides, UV-stabilizers, humectants, pH stabilizers, rheology modifiers, siccatives, adhesion promoters, antioxidants, buffers, coalescing agents, extenders, leveling agents, neutralizers, optical brighteners, pearlescents, plasticizers, polymeric additives, preservatives, reactive diluents, thickeners, tackifiers and waxes.

Additives can be present in an amounts up to 10 wt %, preferably 0.1-5 wt %.

One of the additives that may be present in the solid colorant are antioxidants. Examples of suitable antioxidants include the well-known classes of the sterically hindered phenols, of the aromatic amines, of the thiosynergists, of the phosphites and phosphonites and of the sterically hindered amines. Antioxidants based on sterically hindered phenols comprise, as an essential building block, a phenol substituted by at least one tert-butyl group ortho and in particular by a tert-butyl group in both ortho positions relative to the OH group. Most known products comprise a plurality of these building blocks, which are bonded to each other via various bridging members.

Antioxidants based on aromatic amines are mainly diarylamines, amine-ketone condensation products, for example aniline-acetone condensates, and substituted p-phenylenediamines.

Examples of thiosynergists are the metal salts of dialkyldithiocarbamic acids, zinc dialkyl dithiophosphates and esters (especially dilauryl, dimyristyl and distearyl esters) of thiodipropionic acid.

Antioxidants based on phosphites and phosphonites are typically the esters of the corresponding acids of phosphorus with alkyl-substituted, especially tert-butyl-substituted, phenols.

Antioxidants based on sterically hindered amines (HALS) comprise, as an essential building block, a 2,6-dialkyl-substituted, in particular a -dimethyl-substituted piperidine linked in position 4 to further piperidine building blocks via a wide range of bridging members.

Antioxidants are generally known and obtainable for example under the names of Irganox®, Irgaphos®, Chimassorb® and Irgastab® (Ciba), Topanol® (ICI), Hostanox® (Clariant) and Goodrite® (Goodyear).

When the liquid pigment dispersion comprises an antioxidant, the antioxidant content will generally be between 0.1 wt % to 5 wt %, and preferably between 0.1 wt % to 2 wt %, based on the overall weight of the liquid pigment dispersion.

Preferably, the liquid pigment dispersion may further comprise a defoaming agent. A defoaming agent is a chemical additive that reduces and hinders the formation of foam during processing of colorant. Examples of defoaming agents are insoluble oils, polydimethylsiloxanes, polyether siloxane copolymers and other silicones, certain alcohols, stearates and glycols. Commercially available defoaming agents are for example from Tego, Byk or Borchers.

The amount of defoaming agent is between 0.1 and 2 wt %, preferably between 0.1 and 1 wt %, more preferably between 0.1 and 0.5 wt %, relative to the total weight of the liquid pigment dispersion.

The liquid pigment dispersion may contain a small amount of biocides (between 0.01 and 0.5 wt %, relative to the total weight of the liquid pigment dispersion). Biocides can be added to the liquid pigment dispersion to protect them against biological infestation and growth.

The solid colorant according to the invention can contain colorless fillers.

The fillers are usually insoluble in the solvent and are selected in particular from the following chemical classes (not only products of natural origin but also products of synthetic origin being recited by way of example): oxides and hydroxides: natural: aluminum oxide and magnesium oxide; synthetic: aluminum hydroxide and magnesium hydroxide; silicon dioxide and silicates: natural: quartz, christobalite, kieselguhr, talc, kaolin, diatomaceous earth, mica, wollastonite and feldspar; synthetic: fumed silica, precipitated silica, aluminosilicates and calcined aluminosilicates; carbonates: natural: carbonates of calcium and of magnesium, such as calcite, chalk, dolomite and magnesite; synthetic: precipitated calcium carbonate; sulfates: natural: sulfates of barium and of calcium, such as barite and gypsum; synthetic: precipitated barium sulfate.

The amount of colorless fillers is between 0 and 60 wt %. In one embodiment the amount of colorless filler is between 5 and 40 wt %, relative to the total weight of the solid colorant.

The solid colorant according to the invention may comprise a binder. The binders can be polymeric binders including latex polymers and solution polymers. Exemplary binders include but are not limited to acrylic copolymers, styrene/acrylic copolymers, vinyl acetate copolymers, vinyl acetate/acrylic copolymers, vinyl versatic acid ester/acrylic copolymers, ethylene/vinyl acetate copolymers, styrene/butadiene copolymers, polyesters, drying oil modified polymers such as polyesters and polyurethanes, polyamides, epoxy esters, polyureas, polyurethanes, polysiloxanes, silicones, fluorinated copolymers such as vinylidene fluoride, and blends of any of the above polymeric binders. The base paints, stains or colorants may include a component or components of a multicomponent (e.g., two component) reactive system for the binder such as a component of an isocyanate-polyamine, isocyanate-polyol, epoxy-polyamine, carbodiimide-polyacid, aziridine-polyacid, melamine-polyol, or urea formaldehyde-polyol system. The amount of binder is between 0 and 15 wt %, or for example 1 and 10 wt %, or 3 and 7 wt %, relative to the total weight of the solid colorant.

The glass transition temperature for the polymeric binder may for example be about −20 to about +60° C.

The invention also relates to a liquid pigment dispersion which can be used to prepare the solid colorant according to the invention.

The liquid pigment dispersion comprises
a) 15-75 wt % of a pigment
b) 20-70 wt % of solvent
c) 5-30 wt % surfactant
wherein the wt % is relative to the total weight of the liquid pigment dispersion.

In a preferred embodiment the liquid pigment dispersion comprises
a) 50-75 wt % of a pigment
b) 25-60 wt % of a solvent
c) 5-20 wt % surfactant
d) 0-30 wt % colorless filler
e) 0.1-5 wt % additives
wherein the wt % is relative to the total weight of the liquid pigment dispersion.

The pigment, solvent, surfactant, colorless filler and additives are as defined above for the solid colorant.

The invention also relates to a process for making a solid colorant. The process for making the solid colorant according to the invention comprises the following steps:
a) Providing a liquid pigment dispersion containing at least pigment, solvent and surfactants,
b) spraying of the liquid pigment dispersion to obtain droplets of liquid pigment dispersion
c) Freezing of the droplets of liquid pigment dispersion to obtain a frozen colorant
d) Freeze drying the frozen colorant to obtain the solid colorant.

Preferably the droplets prepared in step b) are uniform of size. Preferably the droplets are frozen in step c) before contact between individual droplets can occur, in order to prevent agglomeration of droplets.

Preferably the solvent is water.

The spraying of the liquid pigment dispersion can be performed by any means. Spraying is usually performed by using a spray nozzle. In the spray nozzle the liquid pigment dispersion is atomized, breaking up of the liquid pigment dispersion into droplets. Spray nozzles can have one or more outlets. Examples of spray nozzles are single fluid nozzles, two fluid nozzles, vibrating nozzles, rotary atomizers and ultrasonic atomizers. Spraying is preferably performed by using a vibrating spray nozzle. The vibrating spray nozzle has a nozzle diameter between 0.1-0.4 mm, preferably between 0.15 and 0.35 mm, more preferably between 0.18 and 0.32 mm. Vibration takes place typically with a frequency between 100 and 5000 Hz, preferably between 200 and 2000 Hz, more preferably between 500 and 1200 Hz.

It is preferable, that the spraying provides uniform droplets. The droplet size is, for example, between 100 and 5000 µm, preferably between 400 and 1400 µm, more preferably between 500 and 1300 µm or between 600 and 1000 µm.

The droplets of liquid dispersion preferably are frozen before they can contact each other and start agglomerating again. For this purpose, a fast cooling step is preferred, which allows the individual droplets to solidify and prevent agglomeration of the individual droplets. Fast cooling can preferably be conducted with a low temperature gas. Air may be cooled with chillers, with liquid carbon dioxide or with other means. The low temperature gas preferably has a temperature between −10 and −200° C., more preferably between −60 and −150° C., or between −50 and −100° C.

Preferably a chilled flow of nitrogen gas having a temperature between −10 and −200° C., more preferably between −50 and −100° C. is used as cooling medium to quickly freeze the individual droplets.

The frozen liquid dispersion droplets are freeze dried in order to remove the majority of solvent from the droplets. By freeze drying the solvent sublimes out of the droplets, leading to an open pore structure of the particles.

In the freezing step the liquid dispersion droplets are brought to a temperature between −10° C. and −200° C., preferably between −50 and −100° C. When the droplets of the liquid dispersion are frozen by contacting with preferably a chilled gas directly after spraying, this freezing step is equal to the prefreezing stage in freeze drying. When the droplets are frozen in another way it might be possible that a prefreezing stage is necessary to bring the frozen colorant to a suitable temperature to start the primary drying stage.

Freeze drying is performed under subatmospheric pressure (vacuum). The pressure is typically below 6 mbar, preferably below 1 mbar, more preferably below 0.1 mbar. The temperature during the freeze drying process is typically <30° C.

The invention relates to the use of solid colorants for tinting paint compositions.

The invention also relates to a system for tinting base paint composition, comprising
 a) At least one base paint composition packaged in a container with a volume of about 0.2 to 20 L equipped with and openable and recloseable lid, cap or other closure for an opening through which a colorant may be dispensed from an automated or manual colorant dispenser into the base paint composition; and
 b) An array of colorants being packaged in containers with a volume from 0.5 to 5 liters provided with a colorant dispenser from which colorant may be dispensed into the base paint composition,
whereby the colorant is a solid colorant and dispensing of the solid colorant is performed in a volumetric way.

Preferably the ratio S/A [Std dev of the particle size distribution/average particle size] of the solid colorant is <25%, preferably <22% and more preferably <20%, Preferably the average particle size of the solid colorants ranges between 400 and 1400 µm, preferably between 500 and 1300 µm, more preferably between 600 and 1000 µm.

Volumetric dosing is the dosing of a predetermined volume of solid colorant. The predetermined volume can be dosed by measuring an initial volume of solid colorant in a colorant dispenser, followed by dosing the solid colorant till an end volume is reached, wherein the predetermined volume is the difference between the initial and the end volume. Alternatively, one may determine the time needed to dispense a certain predetermined volume, when the colorant dispenser doses a constant or known volume per time.

DETAILED DESCRIPTION OF THE INVENTION

EXAMPLES

Figure 1:
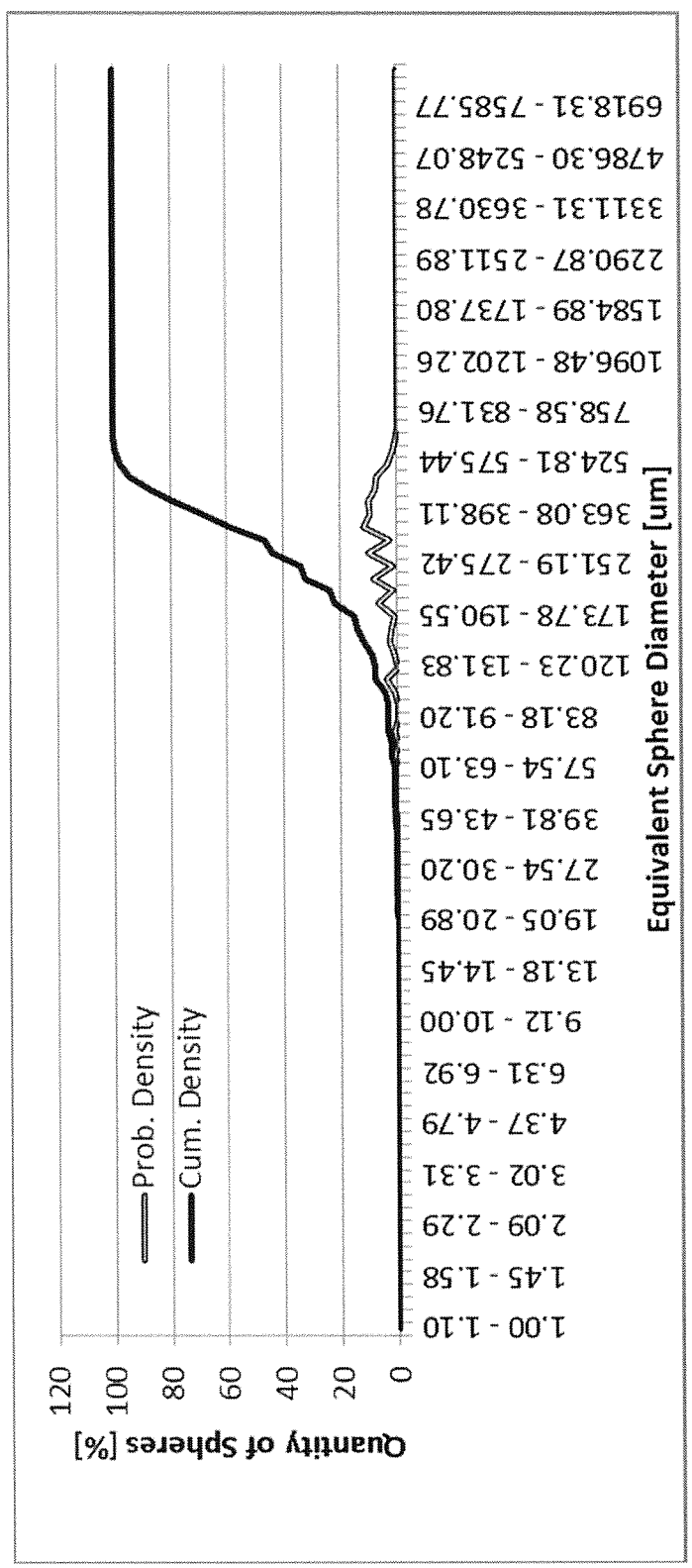
FIG. 1 relates an example of a particles size distribution of particles prepared by a spray drying process.

A number of examples have been prepared to illustrate the invention. The compositions of the liquid pigment dispersion (LPD) to prepare solid colorants (SC) are summarized in table 1.

TABLE 1

List of used materials and recipes

| Raw material (1) Pigment index | Chemical constitution (2) | Oxide Yellow | | Blue | | Green | | Red | |
|---|---|---|---|---|---|---|---|---|---|
| | | (3) LPD PY42 wt % | (4) SC PY42 wt % | (5) LPD PB 15:3 wt % | (6) SC PB 15:3 wt % | (7) LPD PG7 wt % | (8) SC PG7 wt % | (9) LPD PR 254 wt % | (10) SC PR 254 wt % |
| Water | | 41.4 | 1.35 | 61.3 | 1.74 | 39.4 | 1.67 | 36.8 | 1.86 |
| Defoamer | Silicone | 0.15 | 0.14 | 0.38 | 0.37 | 0.49 | 0.51 | 0.24 | 0.22 |
| Surfactants | Di-Phosphate ester Based on alcohol ethoxylate | 11.94 | 10.37 | 13.64 | 11.85 | 15.38 | 14.49 | 5.87 | 4.91 |

TABLE 1-continued

List of used materials and recipes

| Raw material (1) | Chemical constitution (2) | Oxide Yellow | | Blue | | Green | | Red | |
|---|---|---|---|---|---|---|---|---|---|
| | | (3) LPD PY42 wt % | (4) SC PY42 wt % | (5) LPD PB 15:3 wt % | (6) SC PB 15:3 wt % | (7) LPD PG7 wt % | (8) SC PG7 wt % | (9) LPD PR 254 wt % | (10) SC PR 254 wt % |
| Pigment index | | | | | | | | | |
| Pigment PB15:3 | Phthalocyanine Blue | | | 23.97 | 46.28 | | | | |
| Pigment PY42 | Yellow Iron Oxide | 45.59 | 88.02 | | | | | | |
| Pigment PG7 | Phthalocyanine Green | | | | | 39.71 | 83.13 | | |
| Pigment PR254 | Di-Keto-Pyrrolo-Pyrrole (DPP) | | | | | | | 50.0 | 92.96 |
| Biocide | | 0.58 | 0.11 | 0.73 | 0.14 | 0.95 | 0.20 | 0.25 | 0.05 |

LPD = Liquid pigment dispersion
SC = Solid Colorant

Experiment 1: Preparation of a Liquid Pigment Dispersion

The amounts of raw materials needed to prepare the liquid pigment dispersion are given in the recipes (table 1). First, the liquids are weighted into a 10 ltr vessel using a scale. The vessel is placed under a high shear dissolver. The solids materials (amounts weighted in on beforehand in a can) are added slowly using a spoon. The shear of the dissolver should be adjusted that a vortex is visible at all times during addition of the solids. After all solids are added the viscosity is measured on a Stormer rheometer and the viscosity is adjusted before the milling phase (typically between 70 and 120 Krebs Units (KU)) by addition of water. The dispersion is milled on a pearl mill till particle size typically <15 µm. Measurement of the particle size is done with a Hegman gauge (according to SFS-ISO 1524). Viscosity, color strength and color shade (according to CIE lab) are measured and the liquid pigment dispersion is diluted to the required viscosity and color standard.

TABLE 2

Measurements of the liquid pigment dispersions

| (1) | Oxide Yellow (2) | Blue (3) | Green (4) | Red (5) |
|---|---|---|---|---|
| Pigment index | LPD PY42 | LPD PB15:3 | LPD PG7 | LPD PR254 |
| Viscosity | 62 KU | 67 KU | 65 KU | 65 KU |
| Fineness | <15 µm | <15 µm | <15 µm | <15 µm |
| dE against std | 0.35 | 0.52 | 0.19 | 0.26 |
| CS against std | 1.8 | 0.7 | 1.1 | 1.6 |

Experiment 2: Preparation of a Solid Colorant by Comparative Method A

Production of Solid Colorants by Spray Drying:
(a) atomization of a suspension with the aid of a one-material nozzle carried out in a spray tower;
(b) bringing the droplets generated in step (a) in contact with air to dry the same to give granules with a given residual moisture content. The gas inlet temperature in the spray tower is 165° C. The gas outlet temperature is 70° C.
(c) separation of the granules from the gas stream.

Irregular granules have been formed having a large particle size distribution and low porosity (BET values generally ≤15 m$^2$/g, and especially 10 m$^2$/g). The S/A typically ranges between 40 and 60 (see table 4).

Experiment 3: Preparation of a Solid Colorant by Method B

With a vibrating nozzle droplets of the liquid pigment dispersion are formed, which are immediately cooled in a tube containing chilled nitrogen gas stream (in counterflow to the particles) having a temperature between about −78° C. and −70° C. The frozen droplets are collected in a container and freeze dried in a freeze drier (pressure 0.1 mbar and temperature 25° C.)

The vibrating nozzle preferably has a diameter of 0.3 mm. A typical used frequency of 500 Hz, amplitude 400 mV and pressure 110 mbar. Nice well defined solid colorant particles are obtained, having a narrow particle size distribution with S/A between 5 and 20 (see table 4).

Experiment 4: Difference in Solubility Due to Particle Size of the Spheres

To use the solid colorants in practice, the maximum shaking time (using a paint shaker) to develop full color strength in the paint is 2 minutes. The size of the spheres might have an influence on the solubility of the solid colorant.

A liquid pigment dispersion of Oxide Yellow pigment has been made according to experiment 1, using the recipe given in table 1 (column 3). From this liquid pigment dispersion solid colorants have been made using method B as described in experiment 3, resulting in a solid colorants with recipe as given in table 1 (column 4). Depending on the size of the vibrating nozzle different fractions have been obtained.

The solid colorant has been divided in fractions with different particle size (0-250, 250-500, 500-710, 710-1000, 1000-1400, 1400-2000 µm) using sieves with different mesh.

From each fraction 1.3 grams was added to 100 grams of an acrylic white paint in a 120 ml plastic can (height 70 mm, diameter 50 mm). These mixtures were shaken for different times (t=1, 2, 3, 4, 5 and 6 min) in a vibrational paint shaker (e.g. Vibro ST from Corob). After every shaking time the samples were opened, a part of the paint was taken out and a draw-down on a black-white card was made using a block-applicator of 150 μm.

The color strength of all samples has been measured using a spectrophotometer (measurement on Z-axis, according to LAB Color Space). The sample with the smallest particle size (0-250 μm) and shaken for 6 minutes has been used as standard. All other samples have been measured against this standard. The color strength between the standard and the samples is measured and the difference is presented in % in table 2. When the difference in color strength between the standard and the sample <2% the particles are considered as being dissolved.

TABLE 3

Color strength development at different particle size

Color strength development [Fz %], Std 0-250 μm, 6 min shaking time
Fraction size

| Mixing time | 0-250 μm | 250-500 μm | 500-710 μm | 710-1000 μm | 1000-1400 μm | 1400-2000 μm | 2000-2500 μm |
|---|---|---|---|---|---|---|---|
| 1 min | −2.79 | −17.24 | −73.2 | −90.73 | −93.84 | −95.45 | −95.53 |
| 2 min | −1.32 | −0.2 | 0.13 | 0.02 | −0.87 | −34.39 | −58.22 |
| 3 min | −0.87 | 0 | 0.55 | 0.86 | 0.69 | 1.61 | 1.76 |
| 4 min | −0.4 | 0.62 | 0.99 | 0.95 | 0.82 | 2.17 | 3.74 |
| 5 min | −0.12 | 0.46 | 0.91 | 1.62 | 1.27 | 2.08 | 3.77 |
| 6 min | STD | 0.76 | 1.44 | 1.44 | 1.53 | 2.57 | 4.19 |

The particle size of the spheres has an influence on the solubility of the spheres in the paint. Particle size of the largest spheres should be <1400 μm to prevent particle size having influence on the solubility of the spheres into the paint within the required max shaking time of 2 minutes.

Experiment 5: Difference in PSD Due to the Used Production Method for the Solid Colorants An important factor for accurate volumetric dosing of the dispenser or specifically the dosing unit, is the variation in powder particle size.

To determine particle size and particle distribution an OCCHIO ZEPHYR ESR analyzer has been used. The analyzer gives accurate size and shape analysis of free flowing powders with a particle size from 20 μm to 30 mm. The OCCHIO ZEPHYR ESR analyzer works according to the ISO 13322-1 Static image analysis First edition 2004-12-01 standard.

Each sample was given to a vibrating feeder where it was transported to a drop shaft to obtain gravity dispersion of the sample in the OCCHIO ZEPHYR ESR analyzer. Thereafter the camera took pictures from all particles in the focus. For each sample the particle size of 50000 particles was analyzed. The statistical evaluation was performed with the use of CALLISTO-software.

Liquid pigment dispersions of Oxide Yellow, Blue, Green and Red pigment have been made according to experiment 1, using the recipes given in table 1 (columns 3, 5, 7 and 9). From this liquid pigment dispersions solid colorants have been made using method A and method B as described in experiment 2 and 3, resulting in solid colorants with recipes as given in table 1 (columns 4, 6, 8 and 10).

Figure 2:
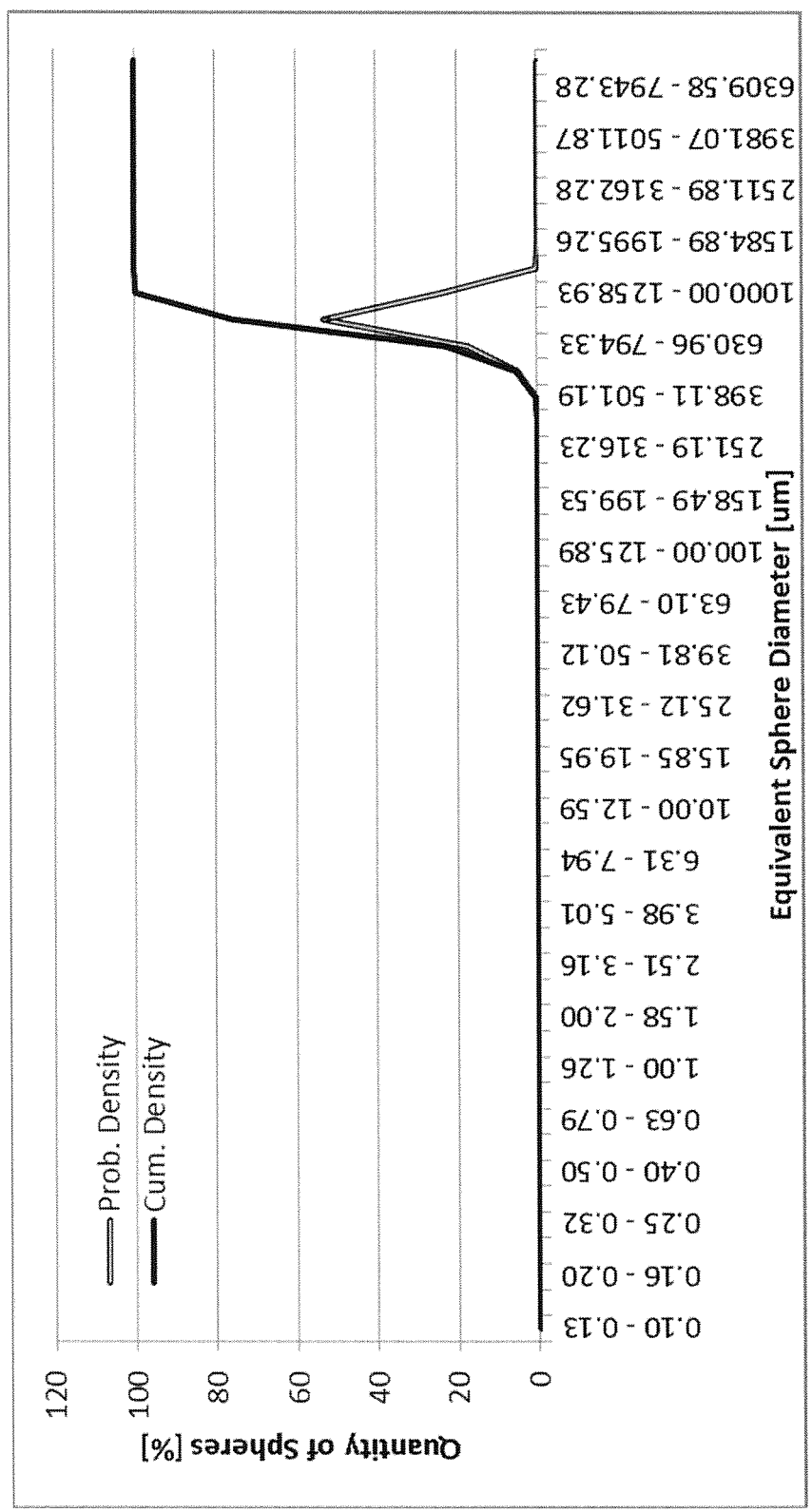
FIG. 2 relates to particles prepared with the process according to the invention.

In table 4 a summary of the results of the PSD measurements are given. The Min-Max and the factor S/A [standard deviation of the particle size distribution/average particle size] (%) are a measure for the homogeneity in size and distribution of the solid colorant, which is an important indication of the flowability. A perfect flowability is required for optimal volumetric dispensing of the spheres. FIGS. 1 and 2 are examples of the difference in PSD using different methods to produce the spheres.

The results show that method A solid colorant spheres are relatively very small in size compared to method B solid colorant spheres. Furthermore, method B spheres show much less size variation than method A spheres. The homogeneity in size (S/A <25%, preferably <20%) seen in method B spheres is an important indication of the excellent flow ability of these spheres.

TABLE 4

Sphere colorant (ISO diameter) data for different types of spheres and solid colorants Sphere size (ISO Inner diameter) (μm)
S/A (%)

| Solid Colorant | Production Method | Min-Max | Average (A) | Std. Dev. (3σ) (S) | Std. Dev./ Average S/A (%) |
|---|---|---|---|---|---|
| Blue PB15:3 | A | 22.5-561 | 198 | 106 | 53% |
|  | B | 560-1350 | 890 | 146 | 16% |
| Oxide Yellow PY42 | A | 22.5-645 | 329 | 132 | 40% |
|  | B | 593-1375 | 978 | 141 | 14% |
| Green PG7 | A | 22.5-921 | 347 | 162 | 47% |
|  | B | 225-1221 | 783 | 160 | 20% |
| Red PR254 | A | 22.5-645 | 190 | 112 | 59% |

Experiment 6: Testing of Volumetric Dosing of Solid Colorants

Figure 3:
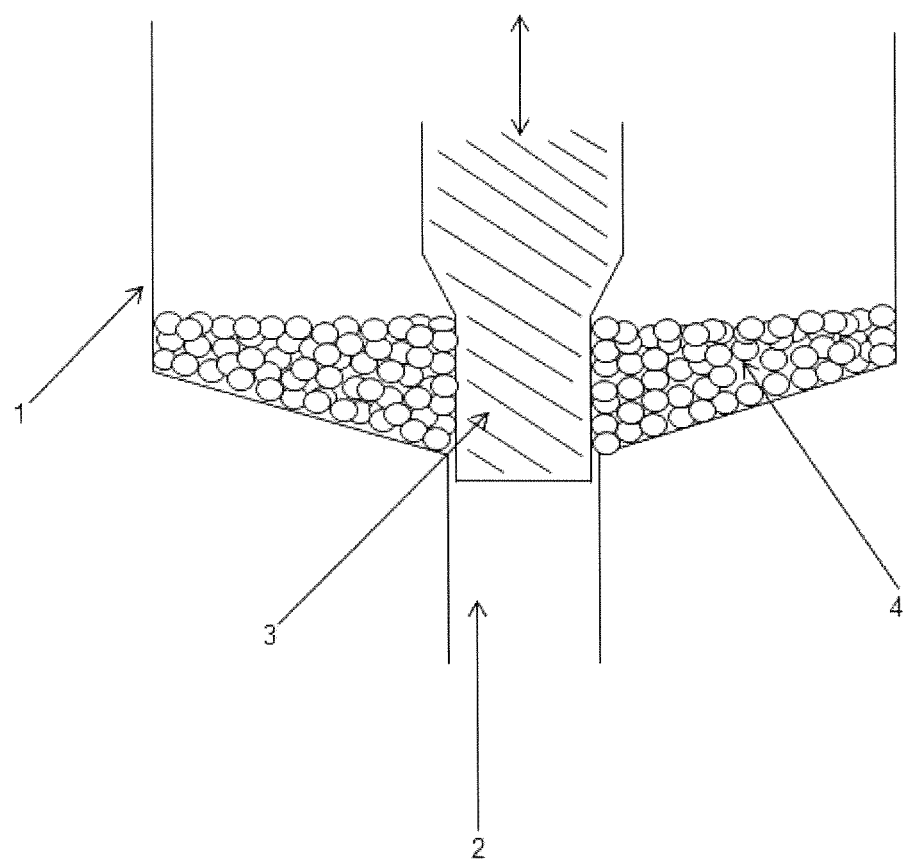
FIG. 3 shows testing equipment for volumetric dosing of solid pigment particles. The testing equipment contains a vessel 1, having an opening 2 for discharging solid particles, a plunger 3 which can be moved up and down to open or close opening 2 of vessel 1 in order to release solid particles 4.

A testing device is constructed for testing volumetric dosing of solid particles. The device is schematically illustrated in FIG. 3. The testing unit contains a vessel or container 1 which has an opening 2 for dosing solid particles. The opening can be opened or closed by means of a plunger 3, which can move up and down. During the time that the plunger is opened, a certain volume of solid colorant will be dosed by gravity.

The volumetric dosage of two samples has been tested with the device as illustrated in FIG. 3.

The following test method has been used:

The plunger is moved down, which means the dosing unit is closed. The container 1 is partially filled with solid spheres. The plunger is moved upwards, which starts the dosing of solid colorant through opening 2 for a determined period of time. The plunger is moved down again in order to close the dosing unit. The amount of spheres is measured by weight, using the tap density to determine the volume.

In the first test the funnel was filled with Oxide Yellow PY42, produced with production method B (see experiment 5, table 4). The particle size ranges between 593-1375 µm, with a narrow particle size distribution (S/A is 14%). With a closed plunger there was no leaking of particles. When filling the funnel the sample looked homogenous; there was no difference in particle size noticed between the top and bottom of the sample.

In the second (comparative) test the funnel was filled with Oxide Yellow PY42 solid spheres, produced with production method A (see experiment 5, table 4). The particle size ranges between 22.5 and 645 µm and S/A is 40%, which means that the particle size distribution is very broad. Even when the plunger 3 was closed, the fraction small particles started to fall through the (small) opening between plunger 3 and opening 2.

Due to leakage of small particles, and the inhomogeneity of the particles in container 1, the dosing of the particles was inaccurate and unreliable. Further it was noticed that during filling of the funnel the bigger particles came to the surface, while the smaller particles moved to the bottom. It is expected that this will result in inaccuracy of volumetric dosing.

From above tests it can be concluded that a small particle size distribution is needed for accurate volumetric dosing. And that volumetric dosing becomes impossible when the particle size of the solid colorants is too small.

What is claimed is:

1. A solid colorant comprising:
   a. 30-97 wt % of a pigment;
   b. less than 5 wt % of a solvent;
   c. 3-40 wt % surfactants;
   d. 0.1-2 wt % of defoaming agent;
   wherein a ratio S/A [Standard dev of the particle size distribution/average particle size] of the solid colorant is <25%, wherein wt % is relative to the total weight of the solid colorant and wherein the particle size distribution is determined with light scattering with fully automated image analysis according to ISO 13322-1 Static image analysis First edition 2004-12-01 by the use of an OCCHIO ZEPHYR ESR analyser; and
   wherein the solid colorant is suitable for dosing in a volumetric way.

2. The solid colorant according to claim 1, wherein the average particle size ranges between 400 and 1400 µm.

3. The solid colorant according to claim 1, wherein the colorant comprises
   a. 50-90 wt % of a pigment;
   b. less than 3 wt % of a solvent;
   c. 5-30 wt % surfactants;
   d. 0.1-5 wt % additives;
   e. 0-20 wt % colorless filler;
   f. 0-10 wt % binder;
   wherein the solid colorant has an average particle size between 400 and 1400 µm.

4. The solid colorant according to claim 1, wherein the colorant comprises 0.1 wt % to 5 wt % of an antioxidant based on the total weight of the solid colorant.

5. A process for making a solid colorant according to claim 1, wherein the process comprises the following steps:
   a. providing a liquid pigment dispersion containing 15-75 wt % of a pigment, 20-70 wt % of solvent and 5-30 wt % surfactant, wherein the wt % is relative to the total weight of the liquid pigment dispersion,
   b. spraying of the liquid pigment dispersion to obtain droplets of liquid pigment dispersion,
   c. freezing of the droplets of liquid pigment dispersion by a chilled flow of a gas having a temperature between −10 and −200° C. to obtain a frozen colorant,
   d. freeze drying the frozen colorant to obtain the solid colorant,
   wherein the spraying is performed by using a vibrating spray nozzle and wherein the vibrating spray nozzle operates with a vibration between 200 and 2000 Hz.

6. The process according to claim 5, wherein the liquid dispersion contains between 50 and 95 wt % solids, relative to the total of the liquid dispersion.

7. The process according to claim 5, wherein spraying is performed with a vibrating spray nozzle having a nozzle diameter between 0.1 and 0.4 mm.

8. A process comprising the steps of: tinting a paint composition with the solid colorant according to claim 1.

9. The process according to claim 8, wherein dosage of solid colorant is performed in a volumetric way.

10. A paint composition comprising a solid colorant according to claim 1.

11. A system for tinting base paint composition, comprising:
    a. at least one light-colored base paint composition packaged in a container with a volume of about 0.2 to 20 L equipped with and openable and reclosable lid, cap or other closure for an opening through which a colorant may be dispensed from an automated or manual colorant dispenser into the base paint composition; and
    b. an array of colorants being packaged in containers with a volume from 0.5 to 5 liters provided with a colorant dispenser from which colorant may be dispensed into the base paint composition,
    whereby the colorant is a solid colorant as defined in claim 1 and dispensing of the solid colorant is performed in a volumetric way.

12. The solid colorant according to claim 2, wherein the ratio of S/A of the solid colorant is less than 22%, wherein the average particle size ranges between 500 and 1300 µm.

13. The solid colorant according to claim 2, wherein the ratio of S/A of the solid colorant is less than 20%, wherein the average particle size ranges between 600 and 1000 µm.

14. The solid colorant according to claim 3, wherein the ratio of S/A of the solid colorant is less than 22%, wherein the average particle size ranges between 500 and 1300 µm.

15. The solid colorant according to claim 3, wherein the ratio of S/A of the solid colorant is less than 20%, wherein the average particle size ranges between 600 and 1000 µm.

16. The solid colorant according to claim 4, wherein the colorant comprises 0.1 wt % to 2 wt % of an antioxidant based on the total weight of the solid colorant, wherein colorant comprises between 0.1 and 1 wt % amount of defoaming agent.

17. The solid colorant according to claim 1, wherein the colorant comprises 0.1 and 0.5 wt % amount of defoaming agent.

18. The process of claim 5, wherein freezing of the droplets of liquid pigment dispersion is by a chilled flow of a gas having a temperature between −50 and −100° C., to obtain a frozen colorant.

* * * * *